United States Patent
Jain (10) Patent No.: US 12,273,708 B2
(45) Date of Patent: Apr. 8, 2025

(54) BSS (BASIC SERVICE SET) FAST TRANSITIONS BETWEEN ACCESS POINTS USING OPPORTUNISTIC KEY GENERATION

(71) Applicant: Fortinet, Inc., Sunnyvale, CA (US)

(72) Inventor: Ankur Jain, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 392 days.

(21) Appl. No.: 17/710,766

(22) Filed: Mar. 31, 2022

(65) Prior Publication Data

US 2023/0319650 A1 Oct. 5, 2023

(51) Int. Cl.
| | | |
|---|---|---|
| *H04W 12/041* | (2021.01) | |
| *H04W 12/03* | (2021.01) | |
| *H04W 12/0431* | (2021.01) | |
| *H04W 12/086* | (2021.01) | |
| *H04W 12/50* | (2021.01) | |
| *H04W 12/73* | (2021.01) | |
| *H04W 36/00* | (2009.01) | |
| *H04W 36/08* | (2009.01) | |
| *H04W 84/12* | (2009.01) | |

(52) U.S. Cl.
CPC ......... *H04W 12/041* (2021.01); *H04W 12/03* (2021.01); *H04W 12/0431* (2021.01); *H04W 12/086* (2021.01); *H04W 12/50* (2021.01); *H04W 12/73* (2021.01); *H04W 36/0011* (2013.01); *H04W 36/0038* (2013.01); *H04W 36/08* (2013.01); *H04W 84/12* (2013.01)

(58) Field of Classification Search
CPC ............... H04W 12/041; H04W 12/03; H04W 12/0431; H04W 12/086; H04W 12/50; H04W 12/73; H04W 36/0011; H04W 36/0038; H04W 36/08; H04W 84/12
See application file for complete search history.

(56) References Cited

U.S. PATENT DOCUMENTS

| | | | | |
|---|---|---|---|---|
| 2017/0026883 A1* | 1/2017 | Joshi | ............... | H04W 36/00835 |
| 2018/0310186 A1* | 10/2018 | Amini | ................ | H04W 72/27 |
| 2022/0022033 A1* | 1/2022 | Ho | .................. | H04W 12/041 |

* cited by examiner

*Primary Examiner* — Cheng-Feng Huang
(74) *Attorney, Agent, or Firm* — Law Office of Dorian Cartwright; Dorian Cartwright (57) ABSTRACT

A station initiates fast BSS transition by a station from the source access point to the target access point. The target access point detects a failure by the Wi-Fi controller to retrieve a PMK-RO key for a requested PMKROName is detected. The PMKROName is parsed from an authentication request of the station. The failure can result in requiring a fresh BSS connection by the station. Responsive to the failure detection, a PMK-RO key is generated in cooperation with the Wi-Fi controller, to prevent requiring the fresh BSS connection. The PMK-R0 key further helps to support fast transition between access points.

5 Claims, 8 Drawing Sheets

BSS (BASIC SERVICE SET) FAST TRANSITIONS BETWEEN ACCESS POINTS USING OPPORTUNISTIC KEY GENERATION

FIELD OF THE INVENTION

The invention relates generally to computer networking, and more specifically, for preventing key failure in BSS fast transition of a station attempting to connect from another access point managed by a Wi-Fi controller to a target access point also managed by the Wi-Fi controller.

BACKGROUND

Wireless was designed to replace the wired network. In wired networks, devices were mostly static and it was nearly impossible to move the devices with active connections due to cable dependencies in wired technology. In wireless network, there was no cable connection to clients, hence they are good to move from one place to another. When wireless client moves, they may go beyond the range of their own access point and move to vicinity of neighbor access points. If the signal strength of own access point becomes poor, client may disconnect and re-connect to another access point with same SSID and this process is called roaming. There are many roaming techniques evolved since inception of wireless. The final aim of each technique is to reduce the delay in wireless transitions of station from one access point to another. Many vendors came across with their own mechanisms as well. Later, IEEE 802.11r was introduced by IEEE which was standardized among vendors for interoperability in IEEE 108.11r standards, when a client roams, it not only avoids the conventional 2-Auth and 2-Assoc frames exchange but also the full 802.1x and 4-way handshake by replacing all these frames by only four FT messages which accelerates the roaming not only for 802.1x but also for PSK connections.

In a centralized network, a Wi-Fi controller has to keep the first level key in FT key hierarchy which is used to generate second level key for the specific access point to support fast transition. However, there could be instances when Wi-Fi controller fails to retain/retrieve/hold the first level key for a station in FT key hierarchy. These are more likely scenarios in large wireless deployments where several devices come in/out all the time. In these scenarios, IEEE 108.11r specification rejects the stations for fast BSS transition and ask them to come back with fresh connection procedures for both PSK and 802.1x connections. A large delay introduces even in PSK due to fresh connection which could be tolerated by file transfer or data traffics however not acceptable for media services, video/multimedia sessions or voice applications. These services being latency & jitter sensitive, requires the support of seamless transition to avoid any glitches in the service. WIFI-6E claims the high efficient wireless network provided by IEEE so far, requires the essential support of seamless, least possible delay voice applications/services to provide end-users, the best possible network experiences in any manner.

Therefore, what is needed is a robust technique for preventing key failure in BSS fast transitions of a station attempting to connect from another access point managed by a Wi-Fi controller to the target access point also managed by the Wi-Fi controller.

SUMMARY

These shortcomings are addressed by the present disclosure of methods, computer program products, and systems for preventing key failure in a BSS fast transition of a station attempting to connect from another access point managed by a Wi-Fi controller to the target access point also managed by the Wi-Fi controller.

In one embodiment, a station initiates fast BSS transition by a station from the source access point to the target access point. The target access point detects a failure by the Wi-Fi controller to retrieve a PMK-R0 key for a requested PMK-R0Name is detected. The PMKR0Name is parsed from an authentication request of the station. The failure can result in requiring a fresh BSS connection by the station.

In another embodiment, responsive to the failure detection, a PMK-R0 (Pairwise Master R0) key is generated in cooperation with the Wi-Fi controller, to prevent requiring the fresh BSS connection. The PMK-R0 key is unique to the station and the Wi-Fi controller. A PMK-R1 key can then be generated based on the PMK-R0 key. The PMK-R1 key is unique to the station and the access point.

In still another embodiment, a PTK (Pairwise Transient) key is generated based on the PMK-R1 key. Encryption and decryption of unicast data frames between the target access point and the station under the Wi-Fi controller utilize the PTK key.

Advantageously, mobile Wi-Fi devices have better performance during roaming, for example, by reducing delays. Also, the network performs better with fewer key failures.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for sharing data and configuration files to synchronize a plurality of virtual machines independent of file sharing technology.

One of ordinary skill in the art will recognize many additional variations made possible by the succinct description of techniques below.

Figure 2:
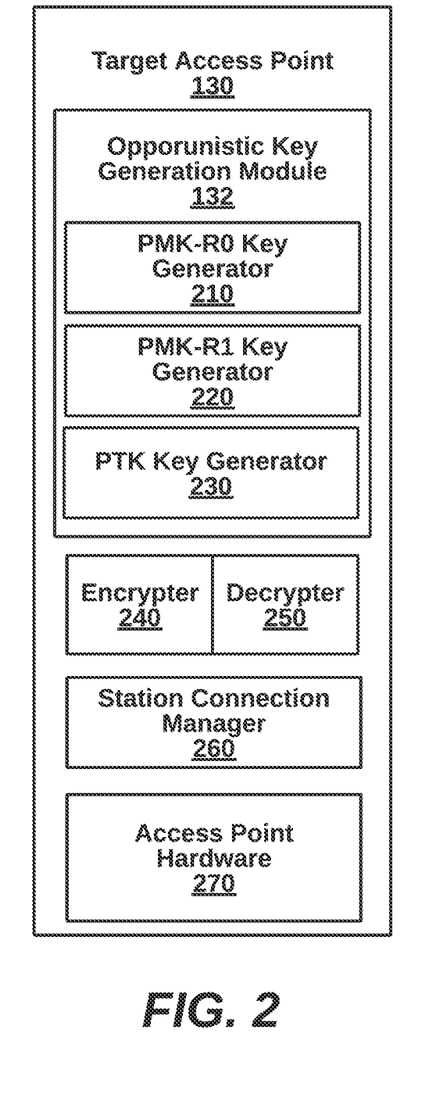
FIG. 2 is a more detailed block diagram illustrating an opportunistic key generator in an opportunistic key generation module of the system of FIG. 1, according to an embodiment.
Figure 3A:
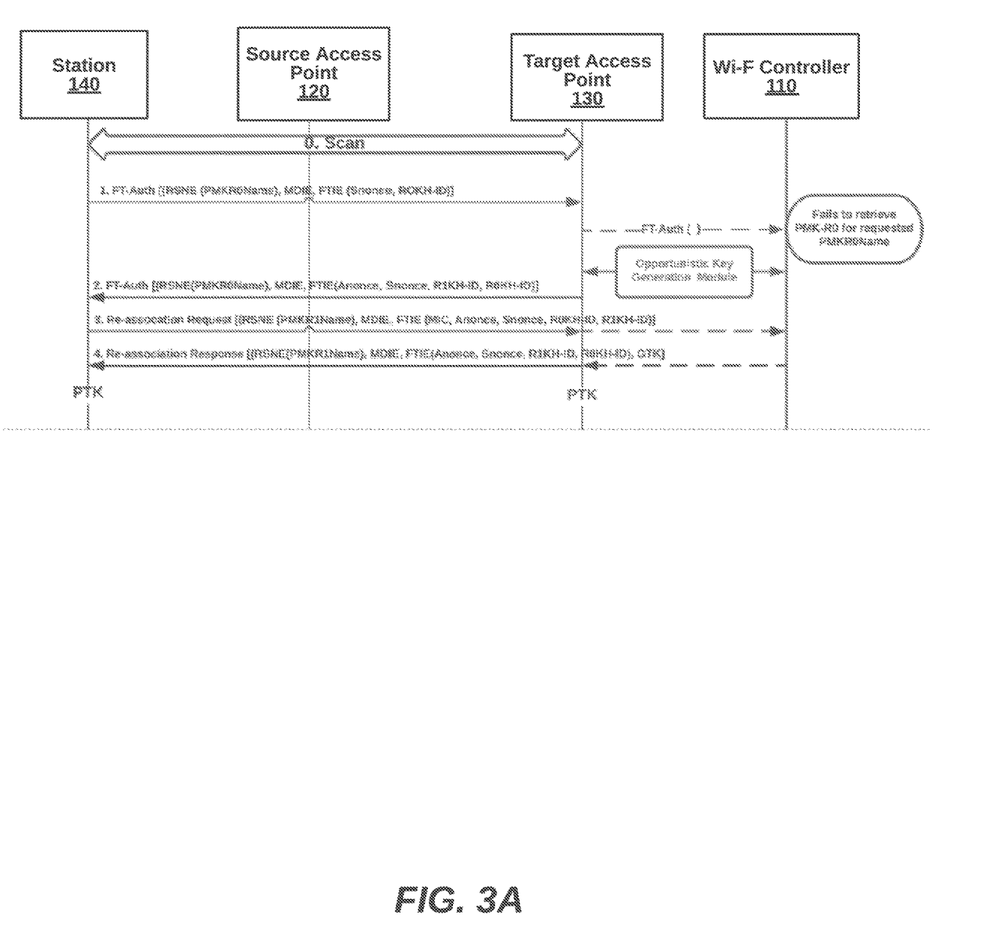
FIG. 3A is a sequence diagram illustrating BSS fast transition with a system initiated PMK-R0 to prevent failure, according to an embodiment.
Figure 3B:
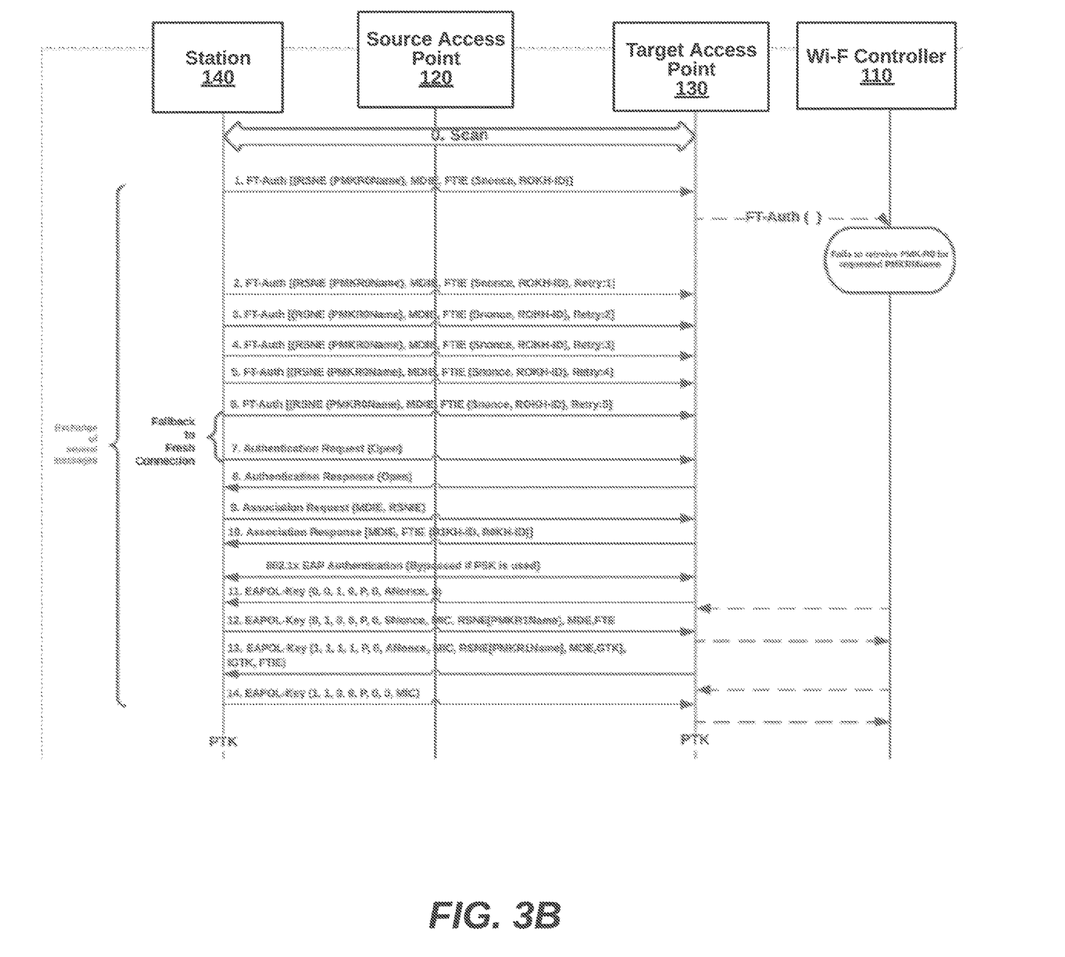
FIG. 3B is a sequence diagram illustrating the system of FIG. 3A due to PMK-R0 retrieval failure, according to an embodiment.
Figure 3C:
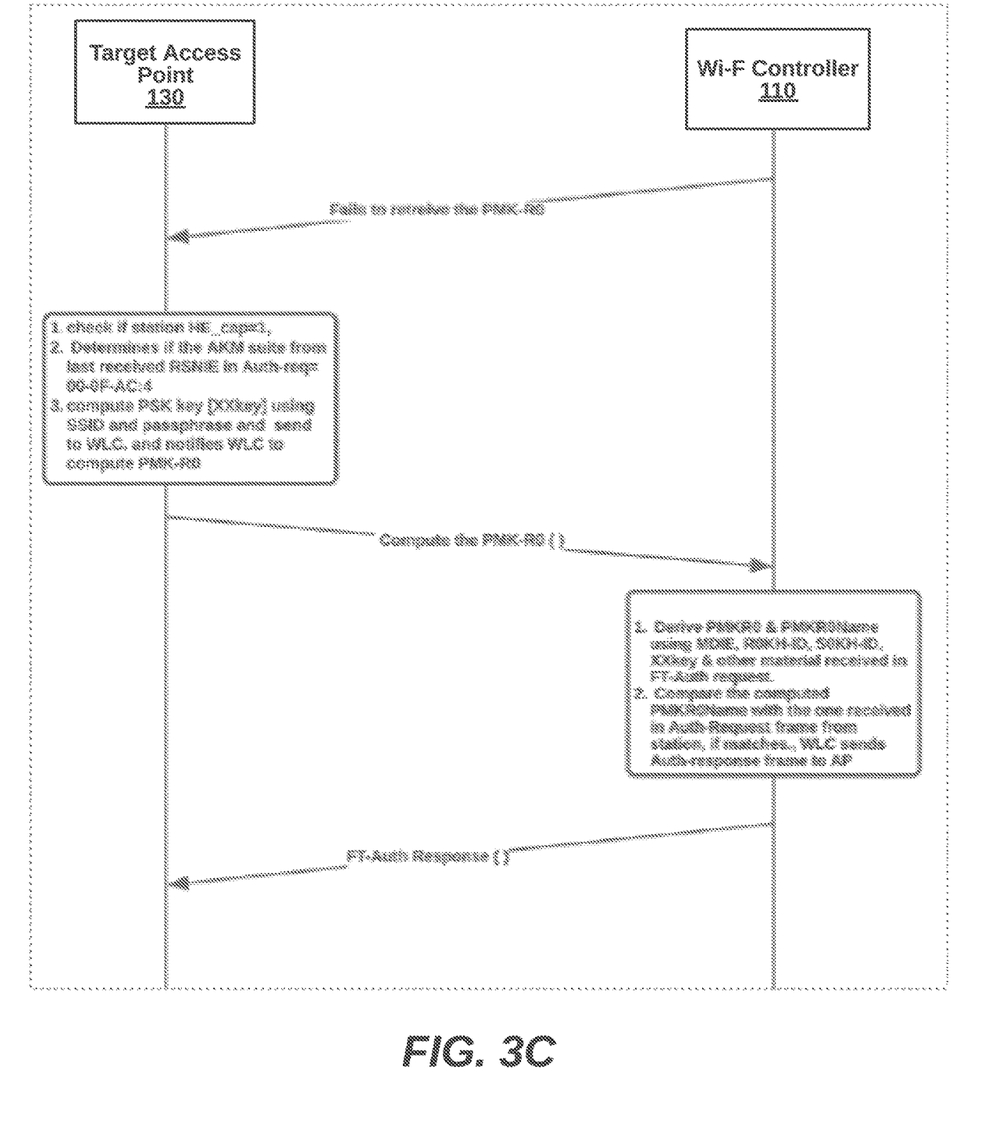
FIG. 3C is a sequence diagram illustrating the opportunistic key generator module working between target AP and controller.

I. Systems for BSS Fast Transition (FIGS. 1-3)

Figure 1:
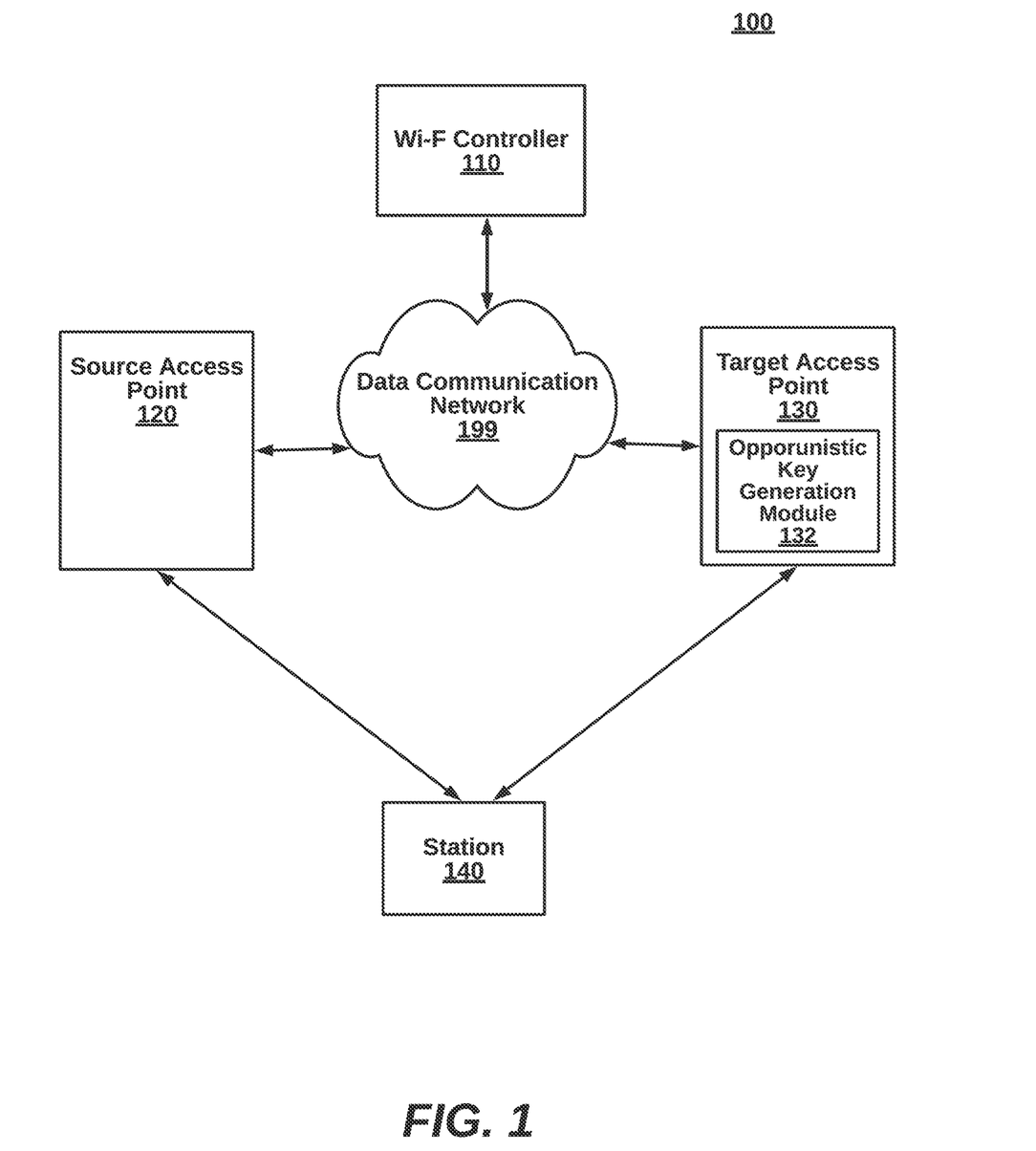
FIG. 1 is a block diagram illustrating a file sharing system for preventing key failure in BSS fast transitions of a station attempting to connect from another access point managed by a Wi-Fi controller to a target access point also managed by the Wi-Fi controller, according to an embodiment.

FIG. 1 is a block diagram illustrating a file sharing system 100 for preventing key failure with a generated key in BSS fast transition of a station attempting to connect from another access point managed by a Wi-Fi controller to a target access point also managed by the Wi-Fi controller, according to an embodiment. The system 100 includes an opportunistic key module 110, an access point 120 and a station 130, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802.11r, and the like.

The station 140 is compatible with IEEE 802.11r and initiates fast BSS transition by a station from the source access point 120 to the target access point 130. As shown in FIG. 3A versus FIG. 3B, a check for the PTK key can result in proceeding with fast BSS transition as in FIG. 3A, or result in starting over with a fresh BSS transition as in FIG. 3B. In one instance, multiple stations are serviced by multiple access points and have high mobility, leading to a high amount of BSS transitions.

In one embodiment, the target access point 130 initiates PMK-R0 key generation to prevent a key failure, during fast BSS transition of the station 140. The opportunistic key generation module 132 of the target access point 130 is described in further detail below with respect to FIG. 2. The resulting PMK-R0 key is utilized by the target access point 130 to prevent failure in the case when a previously existing PMK-R0 key is not located. The PTK key facilitates secure communications between the target access point 130 and the station 140.

The source access point 130 and the destination access point 140 can change titles depending on which direction a transition is occurring. For example, if the station 140 were transitioning from the target access point 130 back to the source access point 120, the labels should be reversed.

The Wi-Fi controller 110 manages the source access point 120, the target access point 130, the station 140, and can handle many other components. Other implementations can have many more stations and many more access points scaled to a larger geographic area, under management of the Wi-Fi controller 110. In some implementations, the Wi-Fi controller 110 stores PTK keys for stations to use during BSS fast transitions.

FIG. 2 is a more detailed block diagram illustrating an opportunistic key generation module 110 of the file sharing system of FIG. 1, according to an embodiment. The opportunistic key engine 110 includes a PMK-R0 key failure detector 210, a PMK-R0 key generator 220, a PMK-R1 key generator 230, and a PTK key generator 240. The modules can be implemented in source code stored in non-transitory memory executed by a processor. Alternatively, the modules can be implemented in hardware with microcode. The modules can be singular or representative of functionality spread over multiple components. Many other variations are possible.

A station initiates fast BSS transition by a station from the source access point to the target access point, for example, with a request frame. An FTIE element and an MDIE element are part of the request frame. As shown in FIG. 3A versus 3B, a check for the PMK-R0 key can result in proceeding with fast BSS transition as in FIG. 3A, or result in starting over with a fresh BSS transition as in FIG. 3B.

The PMK-R0 key failure detector 210 to the target access point detects a failure by the Wi-Fi controller to retrieve a PMK-R0 key for a requested PMKR0Name is detected. The PMKR0Name is parsed from an authentication request of the station.

The PMK-R0 key generator 220 to, responsive to the failure detection, generate a PMK-R0 key in cooperation with the Wi-Fi controller. The PMK-R0 key is unique to the station and the Wi-Fi controller.

The PMK-R1 230 key generator to generate a PMK-R1 key based on the PMK-R0 key. The PMK-R1 key is unique to the station and the access point.

Below are sample key generations for PMK-R0 and PMK-R1->

R0-Key-Data=KDF-Hash-Length(XXKey, "FT-R0", SSIDlength||SSID||MDID||R0KHlength||R0KH-ID||S0KH-ID)

PMK-R0=L(R0-Key-Data, 0, Q)

PMK-R0Name-Salt=L(R0-Key-Data, Q, 128)

PMKR0Name=Truncate-128(SHA-256("FT-R0N"||PMK-R0Name-Salt))

PMK-R1=KDF-Hash-Length(PMK-R0, "FT-R1", R1KH-ID||S1KH-ID).

The PTK key generator 240 to generate a PTK key based on the PMK-R1 key. In one example, PTK=PRF (PMK+Anonce+SNonce+Mac (AA)+Mac (SA)).

The data packet encryption module 250 to encrypt and decrypt communications between the target access point and the station using the PTK key. Different stations can use different PTK keys with the same access point. Similarly, different access points can use different PTK keys with the same station.

FIG. 3A shows one solution for opportunistic key generation as a sequence of frame interactions between network devices. Station determines suitable target AP for roaming and sends an Authentication-request message with FTIE and MDIE element to target access point. Target access point verifies MDIE and R0KH-ID in received frame and if both are valid, forwards this frame to WLC which carries information of MDIE, PMKR0Name and R0KH-ID. Controller will parse the frame for PMKR0Name so that could identify stored PMK-R0 for the station. Wi-Fi controller fails to retrieve the same PMK-R0 for any reasons, or keys are corrupted or keys are dropped and not retained by Wi-Fi controller. In either case, it will notify to Access Point and enters into opportunistic key generation module.

Access point will check 6E capability in station by parsing HE cap IE in probe req frames. If station is 6E capable, Access point will retrieve the AKM suite in last received RSN-information element in Authentication request frame from station and parse for AKM suite, if access point determines the AKM suite is 00-0F-AC:4, AP will derive the XXkey (material for generating PMK-R0) using help of SSID and passphrase and notify WLC to compute PMKR0 and sends the XXkey to WLC. WLC will further extract MDIE, R0KH-ID and S0KH-ID from Authentication-Request frame and put into KDF function to derive the PMK-R0 and PMKR0Name.

Wi-Fi controller will compare the computed PMKR0Name with the one received in Authentication-Request frame from station, if both are matched, Wi-Fi controller ensured having correct PMKR0 and notifies access point to continue BSS fast transition and access point will send FT-Authentication-Response to station with the information received by Wi-Fi controller. Station and access point/Wi-Fi controller will proceed for fast BSS transition. Thus, opportunistic first level key generation by access point and Wi-Fi controller reduced the delay in BSS transition by avoiding the station going into fresh connection procedure.

II. Methods for BSS Fast Transition (FIGS. 4-5)

Figure 4:
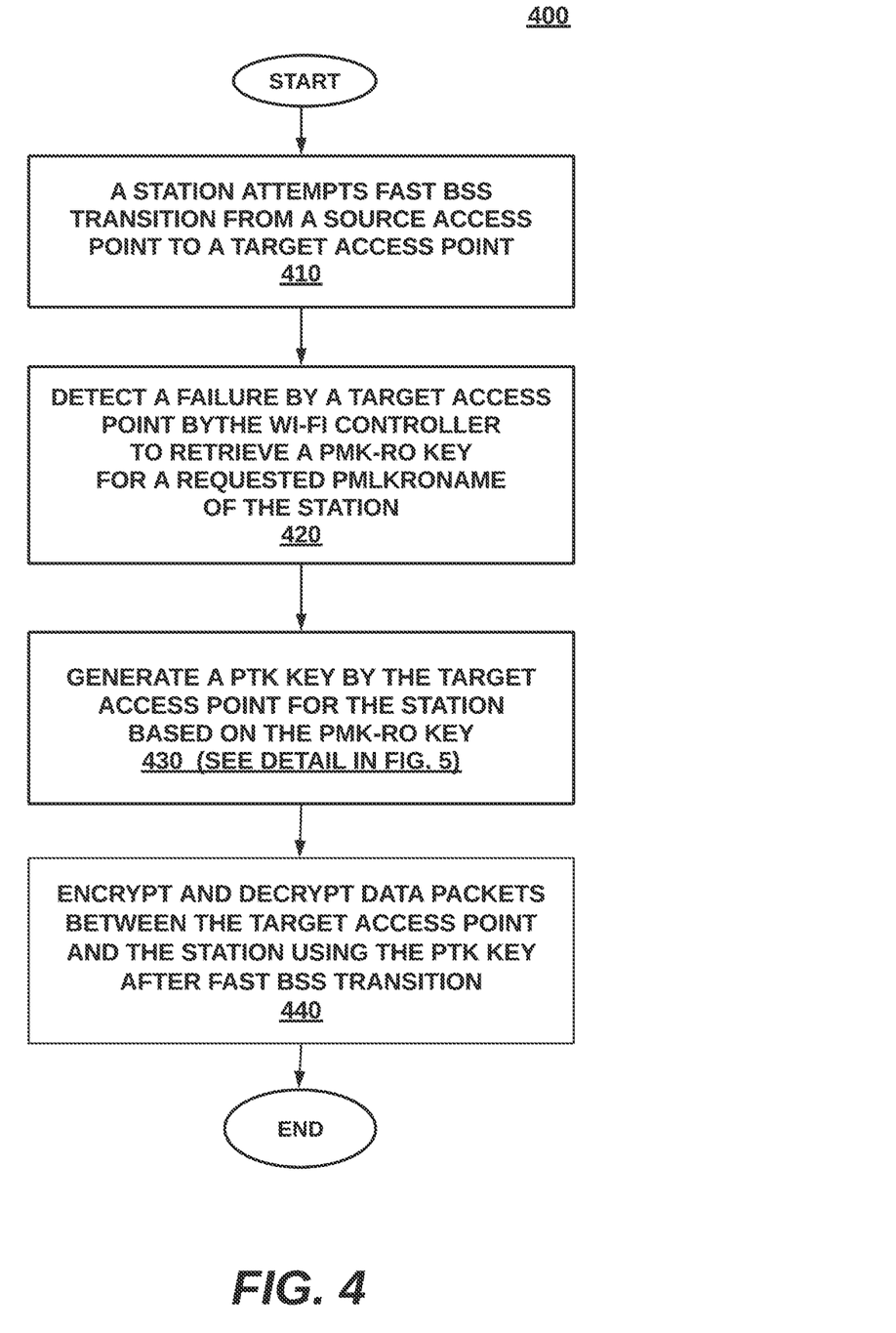
FIG. 4 is a high-level flow diagram illustrating a method for preventing key failure in BSS fast transitions of a station attempting to connect from a source access point managed by a Wi-Fi controller to a target access point also managed by the Wi-Fi controller, according to one preferred embodiment.
Figure 5:
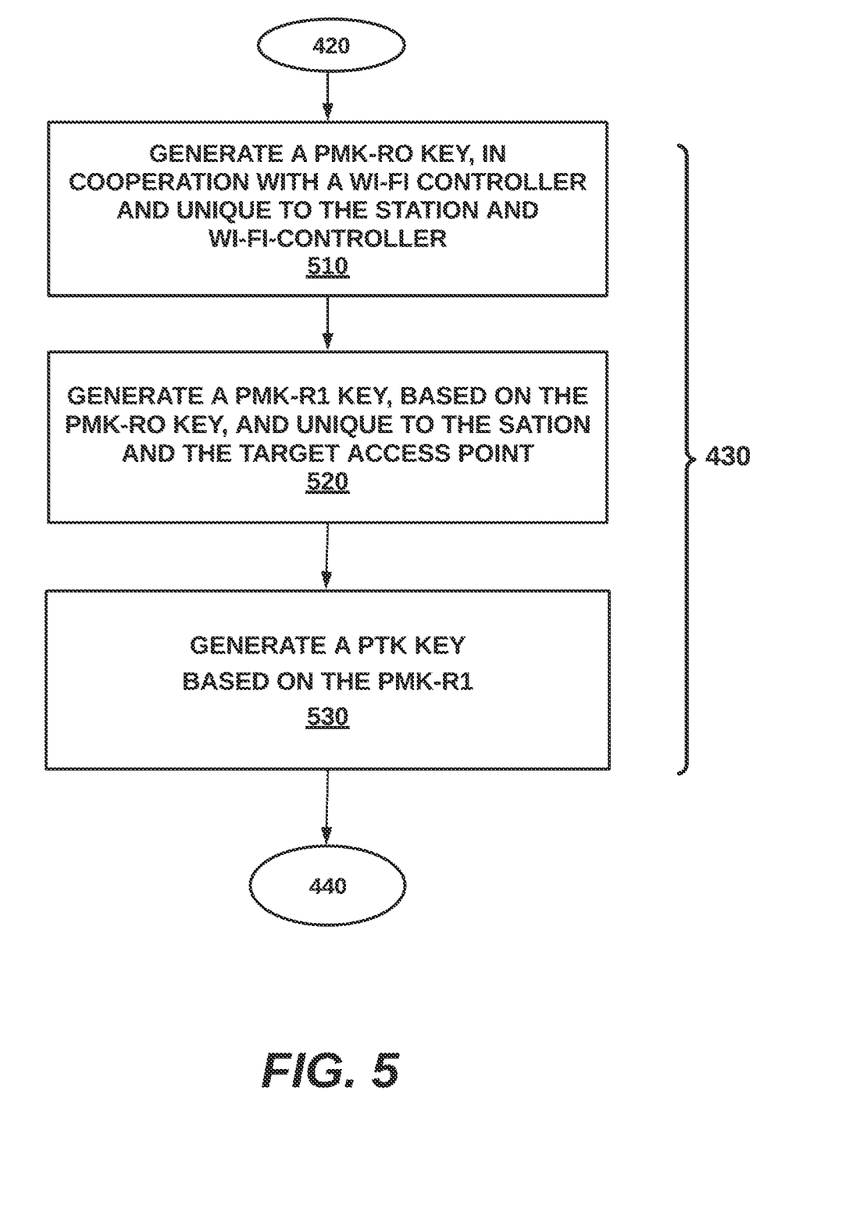
FIG. 5 is a more detailed flow diagram illustrating the step of a PTK key generation based on the PMK-R0 key, for the method of FIG. 4, according to one embodiment.

FIG. 4 is a high-level flow diagram illustrating a method 400 for preventing key failure in fast transition of a station attempting to connect from another access point managed by a Wi-Fi controller to a target access point also managed by the Wi-Fi controller, according to one preferred embodiment. The method 400 can be implemented, for example, by the system 100. The steps are merely representative groupings of functionality, as there can be more or fewer steps, and the steps can be performed in different orders. Many other variations of the method 400 are possible.

At step 410, a station initiates fast BSS transition by a station from the source access point to the target access point. In other transactions, stations transition from different access points under a common Wi-Fi controller. For successful fast BSS transition, a PMK-RO key from the previous connection is retrieved. Upon PMK-RO key misses, key replacement is transparent to end users and user experience with networks.

At step 420, the target access point detects a failure by the Wi-Fi controller to retrieve a PMK-RO key for a requested PMKR0Name is detected. The PMKR0Name is parsed from an authentication request of the station. The failure from PMK-RO key misses can result in requiring a fresh BSS connection process for stations.

At step 430, a PTK key is generated from a PMK-RO key that is generated. More detail on key generation is shown in FIG. 5. At step 510, responsive to the failure detection, a PMK-RO key is generated in cooperation with the Wi-Fi controller, to prevent requiring the fresh BSS connection. The PMK-R0 key is unique to the station and the Wi-Fi controller. At step 520, a PMK-R1 key can then be generated based on the PMK-RO key. The PMK-R1 key is unique to the station and the access point. At step 530, the PTK key is generated based on the PMK-R1 key.

Referring again to FIG. 4, at step 440, encryption and decryption of data frames between the target access point and the station under the Wi-Fi controller utilize the PTK key. A unique PTK can be used for each station under an access point.

III. Generic Computing Environment

Figure 6:
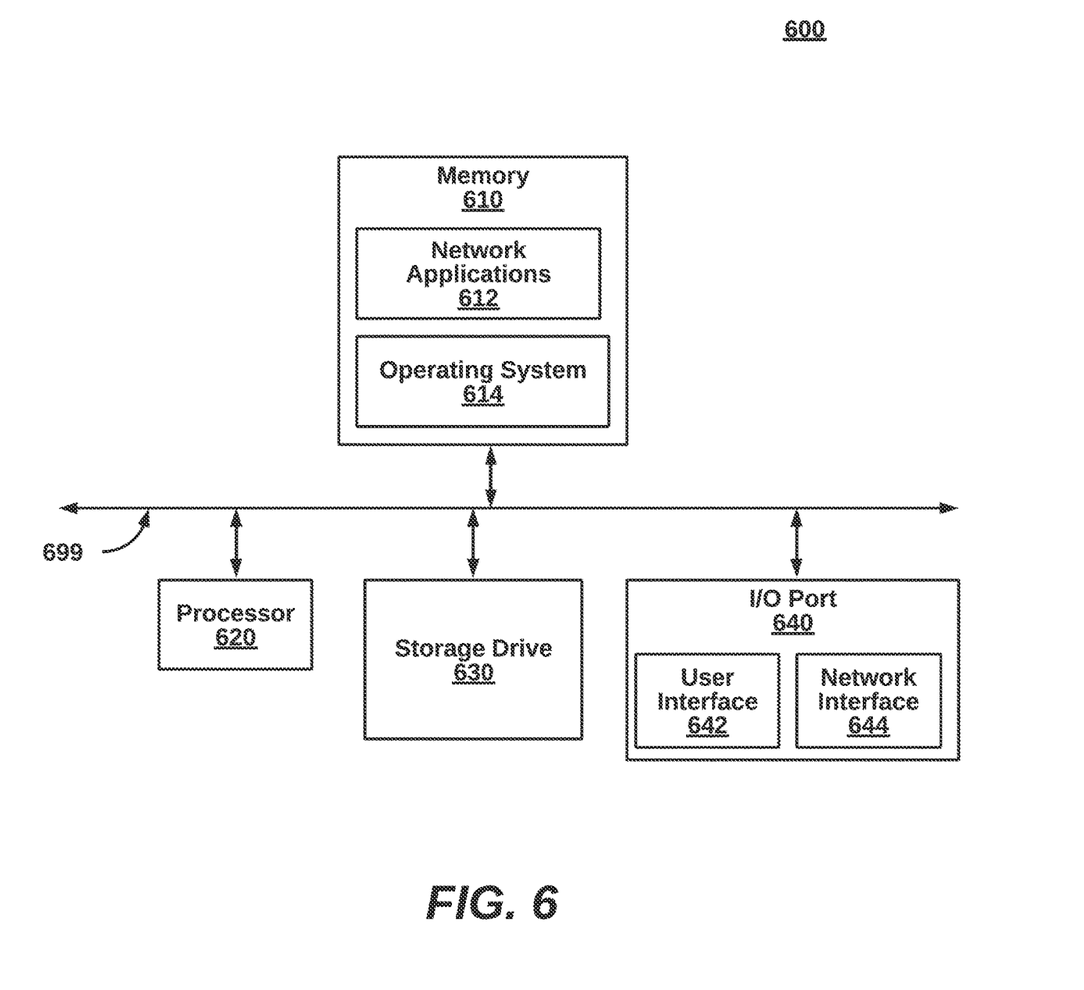
FIG. 6 is a high-level block diagram illustrating a computing device as an example hardware implementation of network devices herein, according to an embodiment.

FIG. 6 is a block diagram illustrating a computing device 600 capable of implementing components of the system, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., Wi-Fi controller 110, source access point 120, target access point 130, and station 140), other networking devices (e.g., an access point, a firewall device, a gateway, a router, or a wireless station), or a disconnected device.

Network applications 612 (e.g., VM nodes 120A-F) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer ⅔ routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

I claim:

1. A target access point communicatively coupled to a data communication network including an IEEE 802.11r-compatible Wi-Fi network with a plurality of stations, and implemented at least partially in hardware, for preventing key failure in BSS (Basic Service Set) fast transition of a station attempting to connect from another access point managed by a Wi-Fi controller to the target access point also managed by the Wi-Fi controller, the target access point comprising:
   a processor;
   a network interface communicatively coupled to the processor and communicatively coupled to exchange data packets over the data communication network; and
   a memory communicatively coupled to the processor and storing:
      a PMK-RO (Pairwise Master RO) key failure detector to detect a failure by the Wi-Fi controller to retrieve a PMK-RO key for a requested PMKROName, wherein the PMKROName is parsed from an authentication request of the station during BSS transitioning from the source access point to the target access point;
      a PMK-RO key generator to, responsive to the failure detection, generate a PMK-RO key in cooperation with the Wi-Fi controller, wherein the PMK-RO key is unique to the station and the Wi-Fi controller, PMK-RO helps to support fast transition, wherein the station is attempting a fast BSS transition from the source access point;
      a PMK-R1 key generator to generate a PMK-R1 key based on the PMK-RO key, wherein the PMK-R1 key is unique to the station and the access point;
      a PTK (Pairwise Transient) key generator to generate a PTK key based on the PMK-R1 key; and
      a data packet encryption module to encrypt and decrypt communications between the target access point and the station using the PTK key using the PTK key after fast BSS transition.

2. The target access point of claim 1, wherein an authentication response is sent from the target access point to the station.

3. The target access point of claim 1, wherein the memory further comprises a standard BSS handshake for a fresh connection of the station responsive to the failure to retrieve the PMK-RO key, and a standard BSS handshake for BSS transition of the station to the target access point is avoided due to the generated PMK-RO key.

4. A method in a target access point communicatively coupled to a data communication network including an IEEE 802.11r-compatible Wi-Fi network with a plurality of stations, for preventing key failure in BSS (Basic Service Set) fast transition of a station attempting to connect from a source access point managed by a Wi-Fi controller to the target access point also managed by the Wi-Fi controller, the method comprising the steps of:
   detecting a failure by the Wi-Fi controller to retrieve a (Pairwise Master RO) PMK-RO key for a requested PMKROName, wherein the PMKROName is parsed from an authentication request of the station BSS transitioning from the source access point to the target access point, wherein the station is attempting a fast BSS transition from the source access point;
   responsive to the failure detection, generating a PMK-RO key in cooperation with the Wi-Fi controller, wherein the PMK-RO key is unique to the station and the Wi-Fi controller;
   generating a PMK-R1 key based on the PMK-RO key, wherein the PMK-R1 key is unique to the station and the access point;
   generating a PTK key based on the PMK-R1 key; and
   encrypting and decrypting communications between the target access point and the station using the PTK key after fast BSS transition.

5. A non-transitory computer-readable media storing source code in target access point communicatively coupled to a data communication network including an IEEE 802.11r-compatible Wi-Fi network with a plurality of stations, that when executed by a processor, performs a method for preventing key failure in BSS (Basic Service Set) fast transition of a station attempting to connect from another access point managed by a Wi-Fi controller to the target access point also managed by the Wi-Fi controller, the method comprising the steps of:
- detecting a failure by the Wi-Fi controller to retrieve a PMK-RO (Pairwise Master RO) key for a requested PMKROName, wherein the PMKROName is parsed from an authentication request of the station BSS transitioning from the source access point to the target access point, wherein the station is attempting a fast BSS transition from the source access point;
- responsive to the failure detection, generating a PMK-RO key in cooperation with the Wi-Fi controller, wherein the PMK-RO key is unique to the station and the Wi-Fi controller;
- generating a PMK-R1 key based on the PMK-RO key, wherein the PMK-R1 key is unique to the station and the access point;
- generating a PTK (Pairwise Transient) key based on the PMK-R1 key; and
- encrypting and decrypting communications between the target access point and the station using the PTK key after fast BSS transition.

* * * * *